June 17, 1941.   E. L. SORENSEN   2,245,878
SAFETY LINK
Filed July 5, 1939
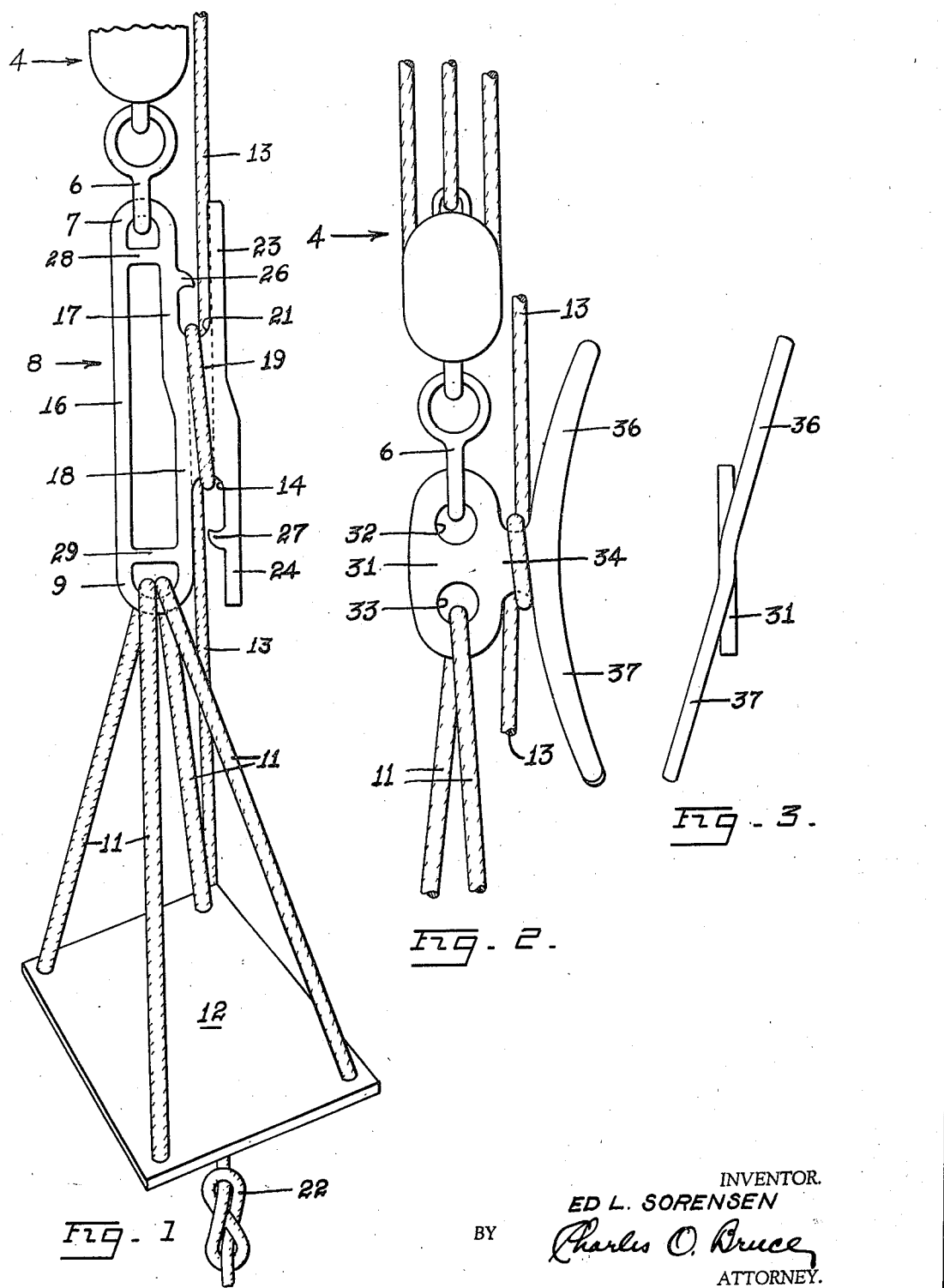
INVENTOR.
ED L. SORENSEN
BY Charles O. Bruce
ATTORNEY.

Patented June 17, 1941

2,245,878

UNITED STATES PATENT OFFICE 2,245,878

SAFETY LINK

Ed L. Sorensen, Albany, Calif.

Application July 5, 1939, Serial No. 282,842

2 Claims. (Cl. 304—32)

My invention relates to safety links, and particularly to a link which will permit rapid and easy manipulation of a supported apparatus with maximum safety to the operator.

Safety links find their greatest use in connection with painting, sand blasting, and similar operations on buildings, ships, radio towers, smoke stacks, and other structures, which require a temporary support, quickly adjustable as to height, for the workman. Common examples of such temporary supports are painters' stages, on which two or more men may work, and the bos'n's chair, which supports a single man. The link is the direct and main tie between the tackle and the slings or supporting ropes of a stage or bos'n's chair, and at the same time cooperates with the girt or hauling line of the tackle so that a workman may raise or lower himself at will.

The safety links previously known in the art are open to certain objections. For example, in some, the hauling line is brought too close to the tackle, binding on it. In others, the pull of the hauling line may tip the link out of vertical alinement, the hauling line may be too far from the operator for ease of manipulation, secure fastening may be slow and difficult, and other difficulties known to those in the art may arise.

My invention may be better understood by reference to the drawing, wherein:

Figure 1 shows a preferred form of my new safety link connecting a bos'n's chair to a tackle.

Figure 2 shows another form of my invention in front view.

Figure 3 is a side view of the embodiment of Figure 2.

My invention has for its primary object the provision of a safe, quickly adjustable link for connecting temporary supports to a tackle. Other objects include providing a safety link about which a girt or hauling line of a tackle may be snubbed; providing a form of link in which adjacent turns of a snubbed line do not unduly bind on each other; providing a safety link form in which the hauling end of the girt line is always close to the operator; providing an improved form of link having a form of cleat about which the line may be secured rapidly and easily; providing a link in which pulling the girt line in or releasing it does not cause the link to tilt; and to provide a more satisfactory connection for a bos'n's chair, painters' stage, or similar devices, to lifts associated therewith.

The invention possesses numerous additional objects and advantageous features, some of which, with the foregoing, will become apparent upon perusal of the following description of my invention. It is to be understood, however, that I do not limit myself to the particular species of invention, since I may adopt variant embodiments thereof within the scope of the claims.

Referring now to the drawing for a more detailed description of my invention, I have shown for first attention in Figure 1 one embodiment of my invention. Here a common type of tackle 4, which I have illustrated fragmentarily to conserve space, is provided with a conventional hook 6 which supports the upper end 7 of my safety link 8. The lower end 9 of such link carries the slings or supporting ropes 11 by which the bos'n's chair 12 is carried. Hauling or girt line 13 of the tackle is brought down and passed under a rounded engaging portion 14 of the link.

The link 8 comprises an elongated vertical side portion 16 connecting the two rounded end portions 7 and 9 on one side, and an opposite vertical side portion 17 connected to the upper rounded end portion 6. Side 17 is connected to an offset lower side portion 18, in turn connected to the rounded lower end 9. From sides 17 and 18, a snubbing member 19 projects laterally, having the rounded lower engaging portion 14 and a corresponding rounded upper engaging portion 21. The center of curvature of the rounded lower engaging portion 14 is offset from vertical alinement with the center of curvature of the upper engaging portion 21 when the link is in its normal vertical position. The hauling or girt line 13 of the tackle, after being carried under engaging portion 14, is brought over upper engaging portion 21, and a knot 22 may be tied in its free end. By offsetting the engaging portions, I have made it possible to let out or haul in the girt line 13 without excessive friction or binding between the turns around snubbing member 19.

An arm 23 extends upwardly from snubbing member 19 parallel to the side 17, and a corresponding arm 24 extends downwardly from the snubbing member parallel to side 18. These arms have several functions. If it is desired to snub the rope more securely, the girt line may be wrapped around the snubbing member 19 several times, the arms 23 and 24 cooperating with sides 17 and 18, respectively, to guide and hold the rope. If a more permanent fastening is desired, half hitches may be thrown around either or both of the arms. In addition, an effective safety measure is provided by forming a spur-like projection 26 on side 17, and a similar spur 27 on arm 24. These spurs extend into the space between an arm and an adjacent side to leave a clearance for the diameter of the hauling line so that in case the workman should lose his hold on the hauling line during adjustment or fail to snub it securely, the hauling line running on the snubbing member may cause a rapid drop of the workman. His descent, however, will be stopped when the knot 22 reaches the first or uppermost spur, the resilience of the rope cushioning the end of the descent, thus preventing serious accident. It is obvious that my safety link may be reversed end for end, and in such case the other spur will become the principal safety factor.

I have found that a very satisfactory link may be made as described above by casting a steel body member having a thickness of about ⅝", or it may be made by machining a flat steel blank having dimensions overall approximately ⅝"×5¼"×18". Obviously, these dimensions are subject to change as desired, and other materials having satisfactory characteristics as to strength and endurance are equally capable of use.

In the embodiment of Figure 1, I have shown additional cross-braces 28 and 29 extending between side 16 and sides 17 and 18, respectively. These braces add strength and rigidity to the link, but in some cases it may be desired to eliminate them, and such elimination may be made whenever desired. For the operator's protection, a loop (not shown) may be carried through end 9, either above or below brace 29, from his safety belt.

It will be noted that the length of the link 8 is considerably greater than is necessary solely for suspension purposes, but it will be seen that such length permits the lower block of the tackle to be held above the head of the operator, where it does not interfere with his vision or with his freedom of motion in the bos'n's chair.

In Figures 2 and 3 I have shown a modified form of my safety link. Here a relatively short link body portion 31 is provided having a pair of apertures 32 and 33 for receiving hook 6 of the tackle and slings 11 of a bos'n's chair or staging. A snubbing member 34 extends laterally from one side of the link and is preferably formed integrally with the body portion. This member is provided with an upwardly extending arm 36 and a downwardly extending arm 37, such arms being curved outwardly from the body portion so as not to interfere with the lower block of the tackle. Such arms not only serve to retain the hauling line 13 on the snubbing member 34 but provide means to which the line may be secured by half-hitches or otherwise as desired.

Arms 36 and 37 may lie in the same plane as the body portion 31 of the link, but are preferably bent at an angle thereto, as shown in Figure 3. The object of so bending the arms is to further avoid interference with the block of the tackle and facilitate securing of the free end of the hauling line thereon.

It is to be understood that the proportions of my link, in either of the embodiments shown, are susceptible of change, and any variations in the details or the exact arrangement of the parts shown are deemed to fall within the scope of my invention.

It is desirable that the center line of drag of the hauling line on the snubbing member be close to the center line passing through the points of connection of the tackle and bos'n's chair to the link in order that the link will not tip, since any appreciable tipping of the link destroys the sense of security of the workman. It is obvious that such center lines are relatively close together in my structure, and in practice I have found that little or no objectional tipping occurs.

In summary, I have invented a form of safety link which provides for the connection of a tackle to a bos'n's chair, painters' scaffold, or other equipment which requires quick adjustability as to height. This link permits easy manipulation, allows the device to be under complete control of the operator at all times, and is so designed that he may quickly hold it in desired position or release it therefrom for movement to a new location. The hauling line of the tackle is held in a position convenient for the operator and may be snubbed on the link without tilting the same out of its normal vertical position. The link may be reversed end for end if it is desired to change the free end of the hauling line to a position closer to or farther away from the center of the link. All these variations in position, together with such changes in the exact details of my construction as will occur to those skilled in the art, are deemed to fall within the scope of the appended claims.

I claim:

1. A safety link, comprising a substantially rigid planar body member, an aperture formed therethrough arranged to receive a tackle, a second aperture formed therethrough arranged to receive connecting means from an object to be supported, a snubbing member extending laterally from an edge and in the median plane of said body member, an upper engaging surface formed on said snubbing member, a lower engaging surface formed on said snubbing member and offset laterally from said upper engaging surface, and an arm formed on said snubbing member adjacent each of said engaging surfaces.

2. In a safety link, a substantially rigid elongated body comprising rounded end members connected by side members, cross braces disposed between said side members adjacent said rounded ends, a snubbing member extending outwardly from one of said side members, laterally offset upper and lower engaging surfaces formed on said snubbing member, arms extending oppositely from said snubbing member adjacent said engaging surfaces and spurs extending between said arms and the adjacent sides of said elongated body.

ED L. SORENSEN.